United States Patent
Barrett et al.

[15] 3,673,589
[45] June 27, 1972

[54] INTRUDER DETECTOR

[72] Inventors: Robert W. Barrett, Hennepin; Pat. S. Preese, Fridley, both of Minn.

[73] Assignee: Current Industries, Incorporated, Minneapolis, Minn.

[22] Filed: May 5, 1969

[21] Appl. No.: 821,868

[52] U.S. Cl. .......................................... 340/258 D, 340/276
[51] Int. Cl. ............................................. G01r 29/12
[58] Field of Search ............... 340/258, 258 D, 258 C, 276

[56] References Cited

UNITED STATES PATENTS

| | | | |
|---|---|---|---|
| 3,346,856 | 10/1967 | Doble et al. | 340/258 C |
| 3,452,346 | 6/1969 | Kupersmit | 340/258 X |
| 3,493,954 | 2/1970 | Bartlett et al. | 340/258 C |
| 2,802,178 | 8/1957 | Shafer et al. | 340/258 C |
| 3,201,775 | 8/1965 | Pedersen | 340/258 D |
| 3,258,762 | 6/1966 | Donner | 340/258 D |
| 3,564,529 | 2/1971 | Kaufman et al. | 340/258 D |

*Primary Examiner*—John W. Caldwell
*Assistant Examiner*—Michael Slobasky
*Attorney*—Stryker and Jacobson

[57] ABSTRACT

A probe is located to carry electric currents brought about by change in the surrounding electrostatic field to produce a signal feeding a high input impedance circuit connected to an operational amplifier connected in the feedback mode to produce an output signal indicative of the presence of an object in the vicinity of the probe which disturbs the electrostatic field. The latter signal is used to feed a monitoring circuit which indicates that the device is operational and an alarm circuit which may be selectively activated.

10 Claims, 1 Drawing Figure

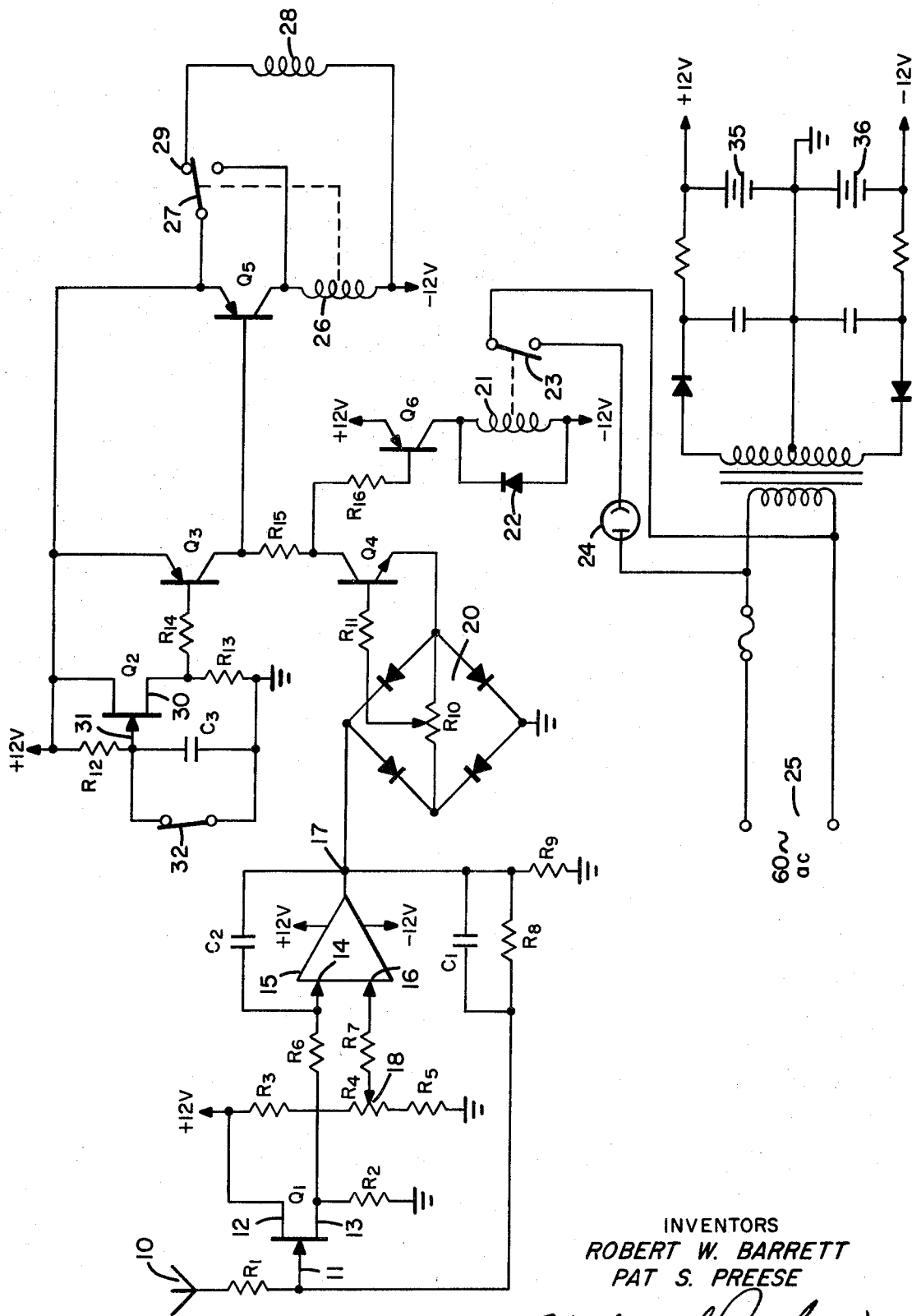

INTRUDER DETECTOR

BACKGROUND OF THE INVENTION

1. Field of the Invention

This invention is directed for use as an intruder detector for operating alarms such as burglar alarms or fire alarms or the like using electronic circuitry in conjunction with an electrostatic field or current sensing probe.

2. Description of the Prior Art

Detectors which respond to changes in a surrounding electrostatic field as sensed by an antenna-like probe have heretofore only been used in controlled environmental areas such as laboratories. Under those conditions the stability and the sensitivity of the instruments could be controlled. One of the practical difficulties that arises in attempting to use a device of this nature as a burglar detector or the like is that the sensitivity of the device must be extremely high to be able to pick up minute variations and yet produce a usable signal in response thereto while at the same time disregarding normal changes in the field during quiescent conditions. Another drawback of prior art devices operating in this mode has been their inability to produce a signal large enough to operate an alarm system from the minute input signals and still present a very high input impedance for the probe to operate into. When the sensitivity of prior art instruments has been made sufficiently high to produce usable signals, their stability has suffered and drift then becomes a major problem. Intruder detectors in general, whether they operate in this fashion or otherwise, have also had a drawback in that there was no way of telling whether the circuit was operational or not unless the alarm was triggered. This, of course, could be a quite disconcerting type of test if a loud bell or siren were used to sound the alarm.

SUMMARY

An electrically conductive sensor element or probe is located in the guarded area to pick up and carry currents produced by change in the electrostatic field surrounding the sensor. A large value resistance is connected to the sensor to produce a voltage signal from the current flow. This signal is fed into a high impedance, matching semiconductor circuit arrangement to produce a a signal input to an operational amplifier having a differential input. The two inputs of the operational amplifier are balanced to zero for quiescent conditions. The output of the operational amplifier is fed into a full-wave rectification circuit to produce a dc signal which is fed to an alarm circuit and to a test indicator circuit. The latter is always in the active condition to indicate that the detection circuit is operational while the former may be selectively deactivated so as not to energize an alarm except during the guarding periods. The feedback circuit of the operational amplifier contains a resistance of extremely high value and is connected back to the input of the impedance matching device to produce a highly sensitive detection circuit. The feedback circuit locks the output to the input and thus provides the necessary drift-free stability required. Additionally, there are provided filtering circuits to eliminate or minimize the effect of what might be considered normal variations in the electrostatic field, for example, those due to nearby power lines or shifts in air currents due to minor temperature variations within the area being guarded or the like.

DESCRIPTION OF THE DRAWING

The single drawing is an electrical schematic illustration of the circuit of a preferred embodiment of the invention.

DESCRIPTION OF THE PREFERRED EMBODIMENT

At the outset, it may be worthwhile to consider the principles involved in sensing the presence of an intruder or the like by a probe member as in the present invention. The capability of a probe sensor to guard a certain area or location is based on the general principle that a foreign object of some unusual occurrence in the guarded area causes fluctuations or variations in what otherwise is a normal electrostatic field. The probe or sensor is an electrical conductor which may take any of a number of different sizes and shapes. The current carried by this probe is made up of conduction currents in the air which are collected by the probe as well as currents which are induced in the probe by changes in electrostatic field in the vicinity of the probe. The theoretical relationship between these currents and the sensing element are well documented in literature. In general, the current sensed is proportional to the geometry of the probe, to the change of the electrostatic field with time, and to the product of air conductivity and electric field. The basic equation which describes the operation of a probe of this nature is as follows:

(1) $$I = M\left(\lambda E + e\frac{dE}{dt}\right)$$

where:
 $I$ = Total current
 $M$ = Effective sensing area of probe
 $E$ = Potential gradient in the air
 $\lambda$ = Conductivity of the air
 $e$ = Dielectric constant of the air Typical values, no limitation thereto being intended, which appear in an equation of this nature, are as follows:
 $I = 1 \times 10^{-8}$ amperes; $M = 1$ m$^2$;
 $E = 100$ Volts/meter; $\lambda = 1 \times 10^{-14}$;
 $e = 8.959 \times 10^{-12}$; $dE/dt = 1,000$ volts/meter/sec.

Variations of fluctuations in electrostatic fields may be produced by either the generation of new electric fields in the presence of an earlier electrostatic field or by disturbances in an existing fixed field. The former may be caused by buildup of an electrostatic charge through friction, such as occurs by a moving body. In the latter a fixed electrostatic field may be one that is merely existing in an area due to its environment or it may be produced by the detection systems itself. In any event, unusual movements in the guarded area in the vicinity of the probe has an effect on the electrostatic field surrounding the probe to vary this field to some degree. This may also be caused by increased temperature brought about by a fire or flame which will generate large quantities of charged particles or ions. These ions, being carried by the rising heated air, will generate electrical currents in the surrounding area of sufficient magnitude to be detected. It has been found that by suitably setting the sensitivity of a detecting instrument, a foreign element such as an intruding body will be detected if it is moving within approximately 5 meters of the probe. This of course, is intended to be an illustrative example and is not intended to be limitative. However, it must be recognized that ordinarily any area, such as a room, has an electrostatic field which, due to ordinary surrounding conditions or elements such as power lines or other disturbances, might also cause fluctuations in the electrostatic field surrounding the probe. The detection device must differentiate between those normal fluctuations which might be considered quiescent conditions, and those that are brought about which are attributable to the presence of a foreign or intruding element or some other unusual happening. In the present device this is achieved by filtering out the very slow and very rapid fluctuations of the electrostatic field which are attributable to usual surrounding conditions. To summarize briefly, it is the electrical currents generated by motion of an intruder, or other unusual occurrences, that are detected and amplified.

CIRCUIT

Turning now to the drawing, an antenna-like, electrically conductive probe or sensing element 10 is suitably located in an area to be guarded, such as the inside of a room. As stated earlier, the probe 10 may have different shapes and preferably is in the form of a long wire or rod. Attached to probe 10 is one end of a high value resistance R1 which typically may be in the order of 10,000 megohms. The other end of R1 is attached to the gate element 11 of a field effect transistor (FET)

Q1. The latter is connected as an impedance matching device and the current that it carries passes from the +12 volt energy source through its electrodes 12 and 13, under control of the action of the gate element 11 and through resistor R2 to ground to produce a signal representation across R2. The ungrounded end of R2 is also connected to one end of resistance R6 which has its other end connected to signal input terminal 14 of an operational amplifier 15. Connected between the +12 volt source and ground is a voltage divider network consisting of series resistors R3, R4 and R5. A movable tap 18 on resistor 14 is connected to another input terminal 16 on operational amplifier 15 through resistance R7. Energy sources of +12 and −12 volts are connected to the operational amplifier 15 to provide the energy for its operation.

At the output junction 17 of operational amplifier 15, capacitor C2 is connected back to signal input 14 to assist in balancing out some of the ripple that might appear at the output. The output signal of operational amplifier 15 is developed across resistor R9 which is connected between the output junction 17 and ground. Resistor R8, which is an extremely high value, typically in the order of 100,000 megohms, is connected back from the output of operational amplifier 15 to gate electrode 11 of FET Q1. Connected across resistor R8 is capacitor C1. The combination of R8 and R1 in conjunction with Q1 presents a very high input impedance to any signal on probe 10 and provides a stable negative feedback circuit which keeps the input signal at the gate element 11 of transistor Q1 nearly at zero level to make the circuit extremely sensitive to small signals on the probe due to slight fluctuations or variations in the electrostatic field sensed by probe 10 while maintaining stability. Capacitor C1, which parallels R8, provides additional filtering because of its low pass characteristic at relatively high frequency signals.

Connected to output junction 17 is a rectifier circuit which is connected up in a commonplace bridge circuit configuration. The signal output from the operational amplifier 15 may be of either polarity so the rectifier circuit 20 produces a single polarity dc electrical output signal.

The output produced across resistor R10 is tapped off and fed through resistor R11 to the base element of NPN transistor 4. The collector circuit of Q4 has a number of different paths. First, it is connected to the base element of PNP transistor Q6 through resistor R16. Also, it is connected through resistor R15 to the base element of PNP transistor Q5 and to the collector element of PNP transistor Q3. In the collector circuit of Q6 is relay coil 21 which has the usual damping diode 22 connected across it, which controls the opening and closing of relay contact 23 which is connected in series between indicator 24 and power source 25. In similar fashion, the collector circuit of transistor Q5 contains relay coil 26 which operates relay contact 27. An energizing coil 28 of an alarm device (not shown) is connected between the normally closed contact 29 and a −12 volt source.

Turning next to transistor Q3, its base element is connected through resistor R14 to one end of resistor R13 and that junction is connected to electrode 30 of FET Q2. The other end of resistor R13 is connected to ground so that across R13 there is developed a signal output proportional to the conduction of current through Q2. The gate element 31 of Q2 is connected through resistor R12 to the +12 volt source and a delay capacitor C3 is connected between gate element 31 and ground. A manually operable, on-off switch 32 is also connected between gate element 31 and ground.

CIRCUIT OPERATION

The operation of the circuit shown in the drawing will now be described. Initially, tap 18 on R4 in the voltage divider network from +12 is adjusted, at quiescent condition, to balance out any signal input at input terminal 14 so that there is no output signal from operational amplifier 15 at output junction 17. This is a zeroing adjustment for balancing the detector circuit at quiescent condition. The movement of an intruding object or person in the vicinity of probe 10 produces a variation of fluctuation in the electrostatic field surrounding the probe to in turn produce a current in probe 10. The theoretical amount of current that is collected by probe 10 can be determined from equation (1) above for the established conditions. The resulting signal produced by the current passing through R1 is applied to gate element 11 of Q1 to change the amount of current flowing through resistor R2 to thereby produce a change in the signal to input terminal 14 of operational amplifier 15. The resulting output signal at junction 17 is rectified by rectifier circuit 20. To keep the input at near zero potential as well as the signal amplification as stable as possible, part of the output signal at 17 is fed back to gate element 11 through high resistance R8 180° out of phase with the input. Capacitor C1 helps filter out the relatively high frequency fluctuations which might be produced by nearby power lines or the like which affect the electrostatic field in the vicinity of probe 10. When the output signal reaches a certain level, depending upon the setting of the tap on R10, the drive on the base of transistor Q4 will make it conduct heavily to provide sufficient drive to the base of transistor Q6 to switch it to the heavy conduction state. The base of transistor Q5 is similarly driven but it will be kept in the off or nonconduction condition by the action of transistor Q3, as will be described later. When transistor Q6 turns on it energizes relay coil 21 to close contact 23 to complete the circuit path from power source 25 to indicator 24 to give a visual indication that the circuit is functioning properly.

Turning next to the part of the circuit involving transistors Q2, Q3 and Q5, ordinarily when the detector is to be inactive, e.g., during normal daylight hours, switch 32 is placed in the closed condition, as shown, putting gate element 31 of FET Q2 at ground. Only a small amount of current will flow through FET Q2 and the resulting signal at the junction of R13 and R14 will be such that the base element of Q3 will be sufficiently negative with respect to the emitter to drive Q3 into heavy conduction. This will place the collector of Q3 at substantially +12 volts which means that the base element of transistor Q5 is also at that potential level keeping Q5 in a low conduction state. Q5 does not pass sufficient current to energize relay coil 26 so contact 27 remains in the position shown in the drawing. Accordingly, relay coil 28 will be energized by the +12 volt source and its associated contacts in the alarm circuits, not shown, are held in the open condition. To place the detector unit in the active state, switch 32 is opened, e.g., by operation of a tamperproof key-operated lock, to remove ground from gate element 31. Capacitor C3 will then start to charge up to 30 12 volt through R12. This provides a delay so that person who had manipulated switch 32 can leave the area without triggering the alarms. After a suitable delay determined by the R12–C3 time constant, FET Q2 will increase in conduction so that the junction of R13 and R14 approaches the level of +12 volts to thereby reduce the drive on transistor Q3 and put it in the low conduction state. This then places the alarm circuit, as operated by transistor Q5, in the ready condition. A signal which is then developed across R10 sufficient to drive Q4 to the conduction state, as described earlier, will similarly cause Q5 to conduct heavily thereby energizing relay coil 26 moving contact 27 to its other position to lock relay coil 26 in the energized condition. At the same time, energizing current to alarm coil 28 is removed to allow the alarm relay contacts (not shown) to switch to their positions in which the alarm is sounded. The alarm will then continue to sound until some corrective or reset action is taken. This may be done in a number of ways, the simplest being to provide some means for manually moving relay contact 27 back to its first position (that shown in the drawing). This assumes, of course, that whatever caused the alarm to work has since been removed. Another way is to provide a manually operable momentary-open switch in the line from the +12 volt source to the emitter of Q5 so that the current flow to relay coil 26 can be momentarily interrupted allowing contact 27 to drop back to its first position.

As a further feature of this invention the +12 and −12 volt sources are obtained, in a commonplace fashion, from an AC source 25 through suitable transformation and rectification. But batteries 35 and 36, preferably of the nickel-cadmium variety, are placed across the 12 volt sources. During normal operation the batteries receive a trickle charge from the 12 volt sources but in the event of a power supply failure, batteries 35 and 36 would then provide the power to operate the circuit for a long period of time. If the fault is not fixed so that the batteries run down, relay coil 28 would eventually be de-energized, thereby closing the alarm circuit to call attention to the power failure.

A unit which has been built and operated satisfactorily to energize an alarm upon the presence of an intruder or foreign object within the area surrounding the probe has been constructed with the following resistance and capacitance values:

| R1 | 10,000 megohms | R9  | 1.2 K       |
|----|----------------|-----|-------------|
| R2 | 3.9 K          | R10 | 5 K         |
| R3 | 12 K           | R11 | 5.6 K       |
| R4 | 5 K            | R12 | 2.2 megohms |
| R5 | 1.2 K          | R13 | 3.9 K       |
| R6 | 3.3 K          | R14 | 150 K       |
| R7 | 3.3 K          | R15 | 56 K        |
| R8 | 100,000 megohms| R16 | 56 K        |
| C1 | 5 picafarads   |     |             |
| C2 | 1 microfarad   |     |             |
| C3 | 5 microfarads  |     |             |

We claim:

1. An intruder detection device comprising, in combination:
   a. a probe located in an electrostatic field which has a minute conduction current flow in its quiescent state, said probe arranged to sense and carry displacement current resulting from change in the quiescent state of said electrostatic field;
   b. conducting means connected to said probe for carrying the displacement current carried by said probe;
   c. ultra high impedance means coupled to said conducting means for developing a signal proportional to the displacement current carried by said conducting means;
   d. a differential input operational amplifier for producing an amplified output signal;
   e. means coupling said ultra high impedance means to the input of said operational amplifier for feeding at least part of said developed signal as an input thereto;
   f. indicator circuit means coupled to the output of said operational amplifier for producing visual indications of the signals developed by said operational amplifier to show that said operational amplifier is operative;
   g. alarm circuit means coupled to the output of said operational amplifier for producing an alarm signal in response to the signals developed by said operational amplifier; and
   h. control means connected to said alarm circuit means for selectively disabling or enabling the latter.

2. The invention as set forth in claim 1 further including:
   e. full-wave rectifying means connected to the output of said amplifier for producing a dc signal proportional to the amplifier output; and
   f. means connected to said rectifying means for feeding at least a portion of said dc signal to said indicator circuit means and to said alarm circuit means.

3. An intruder detection device, comprising in combination:
   a. an electrically conductive probe located in an electrostatic field in air which has a minute conduction current flow in its quiescent state, said probe arranged to sense and carry displacement current resulting from change in the quiescent state of said electrostatic field;
   b. ultra high impedance input means coupled to said probe for developing a signal in response to the displacement current carried by said probe;
   c. a differential-input operational amplifier;
   d. means connected to said ultra high impedance means for feeding at least part of said developed signal into the input of said operational amplifier;
   e. rectifying circuit means connected to the output of the operational amplifier for producing a dc signal representation of said output; and
   f. means for feeding at least part of said dc signal to an alarm circuit.

4. The invention as set forth in claim 3 including means for providing a negative feedback signal from the output of said operational amplifier to said high impedance input means.

5. The invention as set forth in claim 4 wherein said ultra high impedance input means comprises: ultra large value resistance means attached electrically in series with the sensor for producing a signal proportional to the current carried by said sensor; a field effect transistor; means for connecting the gate control element of the field effect transistor to said resistance means; a low valued resistance means connected in series with the current-carrying elements of said field effect transistor for producing a signal proportional to the current passing through the transistor; and means for connecting said latter resistance means to a signal input of said operational amplifier.

6. The invention as set forth in claim 5 including: a dc voltage divider network; means for selectively tapping off different dc signal levels from said divider network; and means for connecting said tap means to a second input of said operational amplifier whereby the differential signal input to said amplifier can be adjusted for quiescent conditions.

7. The invention as set forth in claim 5 wherein said ultra large value resistance means comprises: a first high value resistor; a second resistor having a value in the order of 10 times that of said first resistor, said second resistor being attached at one end to one end of the first resistor and at its other end to the output of said operational amplifier for providing a negative feedback path; and conducting means connecting the gate control element of the field effect transistor to the junction of said first and second resistors.

8. The invention as set forth in claim 7 further including capacitor means attached across said second resistor for providing high frequency filtering.

9. An intruder detection device, comprising, in combination:
   a. an electrostatic field having a substantially steady, non-varying, potential gradient in its quiescent state;
   b. a probe located in said electrostatic field arranged to sense and to carry displacement current resulting from a change in the potential gradient of the field brought about by a charged or uncharged body disturbing the quiescent state;
   c. means coupled to said probe for producing an output signal in response to said displacement current;
   d. means for preventing said output signal producing means from producing an output signal when the rate of change of the displacement current is above or below a predetermined frequency range; and
   e. means responsive to said output signal for producing an alarm signal.

10. The invention as set forth in claim 9 wherein said means for producing an output signal includes a differential input operational amplifier.

* * * * *